3,116,110
PRODUCTION OF BERYLLIUM HYDROXIDE

Simon J. Morana, Hazleton, Gordon F. Simons, Drums, and Carl J. Wummer, Shillington, Pa., assignors to The Beryllium Corporation, Reading, Pa., a corporation of Delaware
No Drawing. Filed July 25, 1960, Ser. No. 44,838
7 Claims. (Cl. 23—183)

This invention relates to the production of high purity grade beryllium hydroxide and pertains, more particularly, to the purification of commercial grade beryllium hydroxide for ultimate usage in connection with the preparation of beryllium metal and compounds in general.

The commercial grade of beryllium hydroxide contains a number of impurities, notably, silicon, magnesium, calcium, sodium, iron and aluminum, which occur in percentages sufficiently high to obviate the use of this grade of beryllium oxide for the preparation of high purity beryllium compounds or metal. It is, therefore, of primary concern in connection with this invention to provide a process for obtaining a high purity grade beryllium hydroxide suitable for the preparation of beryllium compounds and metal in which the above elements particularly are within acceptable ranges.

Conventional practice involves the reaction of a commercial grade of beryllium hydroxide with an excess of concentrated sulfuric acid followed by the baking of this reaction mass within a controlled temperature range to dehydrate the silicon content and thereby produce a filterable $SiO_2$. The hydrate is prepared from commercial grade beryllium oxide.

Essentially, the present invention contemplates a method for removing impurities from beryllium hydroxide by reacting commercial grade beryllium hydroxide with an excess of concentrated sulfuric acid and subsequent filtering steps at controlled pH values.

A further object of this invention, in a specific form thereof, contemplates the introduction of a commercial grade of beryllium hydroxide in the form of an aqueous slurry into an excess of concentrated sulfuric acid and in such controlled fashion that the exothermic reactions create the heat necessary to produce the dehydration of the contained silicon impurity to render it in filterable $SiO_2$ form.

In conventional practice, the reaction mass obtained by the reaction of commercial grade beryllium hydroxide with an excess of concentrated sulfuric acid is baked at a temperature of approximately 500° F. for about 3 hours, whereafter the baked mass is diluted with de-ionized water and the silicon content is then filtered off. In contrast to this, in the simplest form of the present invention, the reaction mass is baked and then filtered fractionally by means of a careful pH control to not only remove the contained silicon product but also to remove substantially other impurities. Thus, the present invention contemplates as an improvement over prior art practice the fractional filtration at controlled pH values of the baked reaction mass obtained from the reaction between an aqueous slurry of beryllium hydroxide and an excess of sulfuric acid.

A further object of this invention in more specific form resides in the provision of a method in which the aqueous slurry of beryllium hydroxide is introduced into an excess of sulfuric acid in a controlled fashion so that the temperature of the mixture as achieved by virtue of the exothermic reactions taking place is sufficiently high to obviate the necessity for subsequent baking, this relationship being subsequently followed by fractional filtration as specified above.

Thus, the present invention contemplates not only an improved method for converting commercial grade beryllium hydroxide to a high purity beryllium oxide by means of fractional filtration of the reaction mass at controlled pH values, but also contemplates a method in which the baking step is eliminated, the temperature achieved by exothermic reactions being utilized in lieu of such baking step, the product of which is then subjected to fractional filtration at controlled pH values to ultimately obtain a high purity product suitable for making high purity beryllium compounds and metal.

Essentially then, the present invention contemplates a method for removing impurities from beryllium hydroxide in which the silicon content is removed by conventional means, more specifically, by hydration of the silicon content by utilizing heat in conjunction with the reaction of beryllium hydroxide and concentrated sulfuric acid. The process further contemplates the removal of impurities either by precipitation effected at controlled pH, or by maintaining the impurities in solution by the addition thereto of a sequestering agent or by a combination of both, that is, the precipitation at controlled pH together with the addition of a sequestering agent, the method then contemplating the subsequent conversion of the beryllium sulfate to filterable beryllium hydroxide, which beryllium hydroxide may be converted by conventional means to high purity beryllium hydroxide for the production of high purity beryllium metal or other high purity beryllium compounds.

In so far as the removal of the silicon content impurity is concerned, the present invention contemplates a novel process in which the exothermic reactions between concentrated sulfuric acid and an aqueous slurry of beryllium hydroxide are utilized to produce the dehydration of the contained silicon impurity to render it to a filterable $SiO_2$ form.

After removal of the silicon impurities, the present invention contemplates the removal of substantially all of the remaining impurities by the fractional filtration thereof at controlled pH, or by the addition of a sequestering agent, or a combination of both. In regard to the controlled pH values utilized, certain values have been found to be optimum in producing substantially complete filtering out of the impurities under consideration, whereas in relation to the addition of a sequestering agent, the addition of a chelating agent has been found to be particularly effective.

The above and other objects will become more readily apparent in view of the following specific examples.

In order to clarify and define the term "commercial grade" as utilized in conjunction with this invention, the following table will be useful.

An analysis of a typical commercial grade beryllium hydroxide or a low fired beryllium oxide might well yield the following impurities:

| | | |
|---|---|---|
| Si | percent | 1.0 |
| Fe | do | .1 |
| Al | do | .05 |
| B | p.p.m. | 25 |
| Li | p.p.m. | 15 |
| Cu | percent | .07 |
| Mg | do | 1.5 |
| Mn | do | .02 |
| Ca | do | .2 |
| Na | do | 1.5 |
| F | do | 1.5 |

Whereas it is to be understood that the above table establishes a typical analysis, it is to be understood that the impurities will vary and the above specified impurities are more or less average and are not to be considered as a maximum which might normally be encountered in the industry. In any event, the impurities listed in the table above are in far too great a quantity for the beryllium hydroxide to be utilized directly into the operation of high purity beryllium metal or compounds.

This, of course, is well recognized in the art and such a commercial grade of beryllium hydroxide would normally be purified to some extent before being utilized in the preparation of high purity beryllium metal or compounds. One such conventional process for doing this is to react beryllium hydroxide with an excess of sulfuric acid, the reaction mass being subsequently baked for the purpose of dehydrating the contained silicon product, such baking producing the contained silicon product in its filterable $SiO_2$ form. Subsequently, the baked reaction is diluted with de-ionized water and fractional removal of the impurities is effected by sequential filtering steps. Whereas this process and others similar thereto are effective in reducing the impurity content, the present invention is directed to a process which is more effective and, in general, is more economical of plant equipment.

*Example I*

Plant or commercial grade beryllium hydroxide is reacted with 50% excess sulfuric acid and the resultant reaction mass is baked at a temperature of 260° C. (500° F.) for a period of three hours. The baking dehydrates the contained silicon product to filterable $SiO_2$. The baked reaction mass is then diluted with de-ionized water to approximately 10 grams contained beryllium oxide per liter of solution, after which the impurities are fractionally filtered off by means of a careful pH control.

Iron, aluminum, manganese and other metals can be removed by precipitation substantially completely with negligible loss of beryllium by proper pH control of the beryllium sulfate liquor. In order to minimize the sodium ions in solution, most of the excess sulfuric acid is first neutralized with ammonia to about pH 2 and the solution is brought to about pH 4 with dilute sodium carbonate solution. The solution is then boiled for about fifteen minutes with good agitation and the liquor filtered to remove soluble silica, alkaline earth fluorides and most of the other impurities present.

Further removal of the rest of the impurities present is then achieved with only a negligible loss of beryllium content by adjusting the filtrate to approximately pH 5.3 with dilute ammonia (10% aqueous). The thus adjusted filtrate is boiled for about fifteen minutes with good agitation to redissolve any precipitated beryllium hydroxide and to agglomerate the precipitated impurities making them easier to filter. The solution is then again filtered to remove insoluble impurities.

Next, the filtrate, which now contains substantially pure beryllium sulfate in solution, is adjusted to pH 5.5–7.5, pH 6.5 being preferred, by use of 10% aqueous ammonia to convert the beryllium sulfate into insoluble beryllium hydroxide. This solution is then boiled at 200–215° F., preferably for thirty minutes to densify the precipitated beryllium hydroxide particles and then filtered.

Spectrographic analysis of typical impurities contained in the starting plant grade beryllium oxide and in the beryllium oxide purified in accordance with the above are as follows:

|  | Percent Si | Percent Mg | Percent Ca | Percent Na | Percent Fe | Percent Al |
|---|---|---|---|---|---|---|
| Plant BeO | 1.0 | 1.5 | 0.2 | 1.5 | 0.08 | 0.04 |
| Purified BeO | 0.01 | L0.005 | N.D. | L0.1 | 0.01 | 0.005 |

L=less than.
N.D.=not detected.
0.1 is the lowest limit in the Na determination.

*Example II*

As a second example, plant grade beryllium hydroxide is reacted with about 50% excess sulfuric acid and the reaction mass baked at 260° C. (500° F.) for three hours. The baked sulfate reaction mass is then diluted with de-ionized water to about 50 grams beryllium oxide per liter and the insoluble silica and alkaline earth fluorides are then filtered off. The thus obtained filtrate is then diluted to about 10 grams beryllium oxide per liter with de-ionized water, with small additions of 30% hydrogen peroxide added to insure the presence of contained iron in the more insoluble ferric state. This solution is adjusted to pH 5.3 by means of 10% aqueous ammonia to precipitate out impurities, boiled fifteen minutes with agitation and then filtered. This filtrate, in turn, is adjusted to 5.5–7.5, pH 6.5 preferred, with 10% aqueous ammonia to precipitate out the high purity beryllium hydroxide in the same manner as is discussed in Example I above.

*Example III*

It is possible to simplify the sulfating operation by eliminating the baking step. This is accomplished by placing 50% excess concentrated sulfuric acid into an agitated glass liner vessel and then adding to this beryllium hydroxide as a water slurry containing a carefully controlled amount of water. The slurry is introduced in a steady stream over an extended period of time. The exact time interval is dependent upon the size of the batch and in general the equipment utilized. Normally, for commercial purposes, the time element will vary between three and twenty-five minutes dependent upon the size of the batch being prepared. For example, with a batch of about 10 pounds, the introduction of the excess sulfuric acid is continued over a time period of approximately five minutes. With a 60 pound batch, the time element would be about ten minutes and for a batch of about 200 pounds, twenty minutes is about right. In any event, the important aspect in so far as the time required for adding the sulfuric acid to the slurry is that a peak reaction temperature of at least 300° F. be reached. The reaction temperature is reached as a result of the combined heats of reaction due to the exothermic reaction between the beryllium hydroxide and the concentrated sulfuric acid, the exothermic reaction between concentrated sulfuric acid and water, together with the dehydrating action of the sulfuric acid itself. For this reason, in order to obtain a high degree of efficiency of operation and assure sufficient peak reaction temperature, the amount of water in the beryllium hydroxide slurry must be controlled to effect the complete dehydration of the silicon content. Thus, too little water results in poor dehydration, whereas too much water results in increasingly poor dehydration as the water content is increased.

That is to say, it has been found that optimum results are obtained when the beryllium hydroxide is slurried with an amount of water sufficient to assay 20% beryllium oxide in the slurry. The relationship of concentrations of beryllium oxide in the slurry indicates substantially the following:

|  | Percent | | |
|---|---|---|---|
| BeO contained in slurry | 15 | 20 | 35 |
| Si contained in resulting BeO | 0.03 | 0.007 | 0.08 |

From the above, it will be evident that a drastic difference exists between 15% and 20% beryllium oxide in the slurry as well as between the 20% and 35% beryllium oxide and clearly establishes the optimum relationship existing at about 20% beryllium oxide in the slurry.

An unusual result found to be produced by feeding the beryllium hydroxide slurry as a constant stream into the agitated concentrated sulfuric acid is that a reduction in the amount of concentrated sulfuric acid can be effected without detracting from the efficiency of the process. In relation to this, it has been found that as little as 10% excess sulfuric acid can be used as compared with about 50% excess sulfuric acid with conventional processes.

However, for production runs, 25% excess concentrated sulfuric acid over the calculated stoichiometric value is preferred in order to absolutely assure proper results. Even this, however, establishes an excellent economy as concerns the concentrated sulfuric acid used as compared with conventional processes.

The reaction liquor achieved in the manner set forth above is then treated for removal of impurities in a manner similar to that set forth with regard to Example I above. That is to say, the silicon impurity is removed by dilute filtration since the dehydration of the contained silicon product has already been converted to filterable $SiO_2$ form. This filtrate is then diluted with de-ionized water to approximately 10 grams contained beryllium oxide per liter of solution, after which the impurities are fractionally filtered off by means of a careful pH control in accordance with the process of Example I.

After the impurities have been removed, the filtrate has dilute ammonia added thereto to convert the beryllium sulfate to insoluble beryllium hydroxide which, in turn, is filtered off as a high purity beryllium hydroxide.

*Example IV*

A further improvement in the sulfation process was achieved by placing 55 gallons of concentrated sulfuric acid in an agitated glass lined vessel. One hundred and seventy pounds of contained beryllium oxide in the form of a beryllium hydroxide-water slurry containing a calculated 20% beryllium oxide by weight (about 90 gallons) was pumped as a continuous stream into the agitated sulfuric acid over a period of seven to nine minutes. After an additional fifteen minutes of continued agitation, two hundred gallons of de-ionized water was added. This diluted reaction mixture is filtered sparkling clear in order to remove all of the insoluble dehydrated silica. The clear filtrate is added to 1300 gallons of de-ionized water in another glass lined agitated vessel and sufficient 28% ammonia (about 50 gallons) is added to bring the pH to 3.0 and then two gallons of commercial ethylenediamine tetra acetic acid (sodium salt) was added. The pH is then increased to 6.5 with additional 28% ammonia (about 90 gallons) and the contents are brought to boiling and boiled over one hour with continuous, effective agitation. The pH is then again adjusted to 6.5 with 28% ammonia (about 5 gallons) and the slurry is filtered to result in a clear filtrate containingly mainly ammonium sulfate solution and beryllium hydroxide in the form of a filter cake. Typical impurities calculated on a BeO basis, listed in parts per million (p.p.m.) are as follows:

| | |
|---|---|
| Si | 70 |
| Fe | 20 |
| Al | 20 |
| B | 0.5 |
| Li | 0.5 |
| Cu | L10 |
| Mg | L10 |
| Mn | L30 |
| Cd | 0.5 |
| Ni | L10 |

L=less than.

From the process as set forth above in Example IV, it will be noted, as compared with the process of Examples I–III, that the elimination of impurities, exclusive of the silicon, by means of controlled pH has been obviated. It was found that the use of ethylenediamine tetra acetic acid is capable of keeping the contaminants in solution during the precipitation of the high purity beryllium hydroxide so that it is not necessary to remove these impurities by filtration. In other words, the process according to Example IV completely eliminates the necessity of fractional filtration as used in Examples I–III.

Other chelating agents, in addition to the ethylenediamine tetra acetic acid mentioned above may be used. For example the penta sodium salt of diethylene triamine penta acetic acid and trisodium hydroxyalkyl ethylenediamine triacetate have been found to be successful.

*Example V*

Plant grade beryllium hydroxide is reacted with about 50% excess sulfuric acid and the reaction mass baked at 260° C. (500° F.) for three hours. The baked sulfate reaction mass is then diluted with deionized water to about 50 grams beryllium oxide per liter, and the insoluble silica and alkaline earth fluorides are then filtered off. The thus obtained filtrate is then diluted to about 10 grams of contained beryllium oxide per liter with de-ionized water, 28% ammonia is added to bring the pH to about 3.0, and then an amount of chelating agent sufficient to complex the impurities is added. The pH is increased to 6.5 with aqueous ammonia, and the contents are brought to boiling and held at 210° F. for 30 minutes with continuous, effective agitation. The pH is adjusted to 6.5 with aqueous ammonia, and the slurry is filtered. The resulting high purity beryllium hydroxide will be in the form of a filter cake containing about 50% free water.

*Example VI*

An amount of 50 gallons of concentrated sulfuric acid (10.9% excess $H_2SO_4$) was placed in an agitated glass lined vessel. One hundred and seventy pounds of contained BeO in the form of a beryllium hydroxide-water slurry containing a calculated 20% beryllium oxide by weight (about 90 gallons of slurry) was pumped as a continuous stream into the agitated sulfuric acid over a period of ten minutes. After an additional fifteen minutes of continued agitation, two hundred gallons of de-ionized water was added. The reaction mixture was filtered sparkling clear to remove all of the insoluble dehydrated silica. The clear filtrate was added to 1300 gallons of de-ionized water in another glass lined agitated vessel, and sufficient 28% ammonia was added to bring the pH to 3.0, followed by adding two gallons of commercial 40% ethylenediamine tetra acetic acid. The pH was then increased to 6.5 with additional 28% ammonia and the contents were brought to boiling and boiled one hour with continuous, effective agitation. The pH was again adjusted to 6.5 with 28% ammonia, and the slurry was filtered to result in a clear filtrate containing mainly ammonium sulfate solution, and high purity beryllium hydroxide in the form of a snow white filter cake.

For comparison purposes, the steps of the processes according to Examples I–VI above are set forth hereinbelow in tabular form.

Example I:
(1) React plant grade beryllium hydroxide with 50% excess concentrated sulfuric acid;
(2) Bake the reaction mass at 260° C. for three hours;
(3) Dilute the baked reaction mass with de-ionized water to 10 grams BeO per liter;
(4) Adjust to pH 2 with ammonium hydroxide;
(5) Adjust to pH 4 with sodium carbonate;
(6) Boil for fifteen minutes with agitation;
(7) Filter to remove silica, alkaline earth fluorides and most of the other impurities;
(8) Adjust filtrate to pH 5.3 with ammonium hydroxide;
(9) Boil for fifteen minutes with agitation;
(10) Filter to remove the rest of the other impurities.

This filtrate is now in condition for conversion of the beryllium sulfate to beryllium hydroxide for ultimate use in conjunction with the preparation of high purity beryllium metal and compounds.

Example II:
(1) React plant grade beryllium hydroxide with 50% excess concentrated sulfuric acid;
(2) Bake the reaction mass at 260° C. for three hours;
(3) Dilute the baked reaction mass with de-ionized water to 50 grams BeO per liter;
(4) Filter to remove silica and alkaline earth fluorides;

(5) Dilute to 10 grams BeO per liter with de-ionized water and add a small amount of hydrogen peroxide;
(6) Adjust to pH 5.3 with ammonium hydroxide;
(7) Boil fifteen minutes with agitation;
(8) Filter to remove substantially all of the impurities not removed in step 4.

The filtrate is now in condition for conversion of the beryllium sulfate to high purity beryllium hydroxide, as in Example I above.

Example III:
(1) Mix an aqueous slurry of beryllium hydroxide with the water content such that the slurry contains a calculated BeO of approximately 20% by weight;
(2) Introduce the slurrry as a continuous stream into 50% excess concentrated sulfuric acid;
(3) The reaction mass obtained by 2 above may then be treated according to 3–8 of Example II or 3–10 of Example I;

The filtrate obtained is then ready to convert to high purity beryllium hydroxide.

Example IV:
(1) Prepare a slurry of about 90 gallons containing a calculated 20% beryllium oxide by weight;
(2) Introduce the slurry as a continuous stream into 55 gallons of concentrated sulfuric acid extending over a period of from seven to nine minutes;
(3) Continue agitation for fifteen minutes;
(4) Dilute the reaction liquor with 200 gallons of de-ionized water;
(5) Filter to remove silica;
(6) Dilute with 1300 gallons of de-ionized water and sufficient 28% aqueous ammonia to adjust pH to 3.0;
(7) Add 2 gallons of the chelating agent ethylenediamine tetra acetic acid;
(8) Increase the pH to 6.5 with 28% ammonia (90 gallons);
(9) Boil for one hour with agitation;
(10) Adjust pH to 6.5 with 28% ammonia (approximately 5 gallons);
(11) Filter to obtain a beryllium hydroxide filter cake.

Example V:
(1) React plant grade beryllium hydroxide with 50% excess concentrated sulfuric acid;
(2) Bake the reaction mass at 260° C. for three hours;
(3) Dilute the baked reaction mass with de-ionized water to 50 grams BeO per liter;
(4) Filter to remove silica and alkaline earth fluorides;
(5) Dilute with de-ionized water to 10 grams BeO per liter;
(6) Adjust to pH 3.0 with 28% aqueous ammonia;
(7) Add a chelating agent;
(8) Increase pH to 6.5 with 28% aqueous ammonia;
(9) Boil at 210° F. for thirty minutes with agitation;
(10) Adjust to pH 6.5 with ammonium hydroxide;
(11) Filter to obtain beryllium hydroxide filter cake containing 50% free water.

Example VI:
(1) Prepare a slurry of commercial grade beryllium hydroxide and water, the slurry containing a calculated 20% BeO;
(2) Add 90 gallons of the slurry to 50 gallons of concentrated sulfuric acid, introducing the slurry as a steady stream over a period of about ten minutes with agitation;
(3) Continue agitation for fifteen minutes;
(4) Filter the reaction liquor to remove the silica;
(5) Add 1300 gallons of de-ionized water to the filtrate plus sufficient ammonium hydroxide to increase the pH to 3.0;
(6) Add 2 gallons of ethylenediamine tetra acetic acid;
(7) Increase the pH to 6.5 with 28% ammonium hydroxide;
(8) Boil for one hour with agitation;
(9) Adjust pH to 6.5 with 28% ammonium hydroxide;
(10) Filter to obtain a purified beryllium hydroxide filter cake.

From the above, it will be clear that Examples I, II and V utilize the reaction of plant grade, substantially dry beryllium hydroxide with an excess of concentrated sulfuric acid, which reaction mass is then baked. Examples III, IV and VI, on the other hand, contemplate the preparation of an aqueous slurry of beryllium hydroxide which is introduced into the concentrated sulfuric acid as a steady stream over a predetermined amount of time so as to reach a minimum peak reaction temperature of 300° F. This latter method eliminates the baking step required with Examples I, II and V.

Thus, there is this essential difference between Examples I, II and V on one hand, and Examples III, IV and VI on the other hand.

There also is an essential difference between Examples I, II and III as compared with Examples IV, V and VI. In Examples IV, V and VI, independently of the way in which the filtrate is obtained by removing the silica, that is whether or not the first steps are with substantially dry beryllium hydroxide or a slurry, the impurities other than the silica and alkaline earth fluorides are maintained in solution rather than being filtered out and what is filtered out is a high purity beryllium hydroxide filter cake. In contrast to this, in accordance with Examples I–III, the first filtering step is similar to Examples IV, V and VI in that silica, alkaline earth fluorides and some of the other impuritiees are removed first. However, in Examples I–III, the removal of substantially all of the other impurities is achieved by filtration under controlled pH of the solution and the filtrate obtained as a result of the second filtering step contains beryllium sulfate in solution which is subsequently converted to insoluble beryllium hydroxide by any desired method. That is to say, the present invention does not contemplate within its scope the manner in which the beryllium sulfate in solution in Examples I–III is converted to insoluble beryllium hydroxide, even though in these examples, in each case, a specific manner of making this conversion is set forth.

From the above summarization, it will be clear that the methods outlined contain several sub-combinational features which are important as regards the teachings of this invention. Essentially, these are the fractional filtration at controlled pH, the elimination of the baking step by preparation of a controlled slurry and its introduction in a controlled manner into the acid, and the retention of the majority of the other impurities, exclusive of silica and alkaline earth fluorides in solution by chelating agents as specified so as to directly obtain a beryllium hydroxide filter cake.

It will be noted that Examples I, II, III and V specify 50% excess sulfuric acid, whereas Example IV specifies 21.8% excess sulfuric acid and Example VI specifies 10.9% excess sulfuric acid. Thus, the range in accordance with this disclosure is approximately 10% to 50% excess sulfuric acid.

We claim:
1. In the process of purifying commercial grade beryllium hydroxide containing impurities comprising Si, Mg, Ca, Na, Fe, Al and alkaline earth fluorides, the steps of adding to a solution containing substantially beryllium sulfate and impurities other than silica and alkaline earth fluorides, a chelating agent capable of retaining in solution impurities other than silica and alkaline earth fluorides present in the solution, adding ammonium hydroxide to the solution to precipitate beryllium hydroxide, and then filtering to obtain a substantially pure beryllium hydroxide cake.

2. The method of purifying plant grade beryllium hydroxide which comprises making an aqueous slurry of commercial grade beryllium hydroxide containing impurities comprising Si, Mg, Ca, Na, Fe, Al and alkaline earth fluorides with the slurry containing approximately 20% by weight beryllium oxide in the slurry, introducing the slurry in a continuous fashion into an exces of concentrated sulfuric acid and over a period of time such as to reach a peak reaction temperature in excess of 300° F., filtering the reaction liquor to remove silica and alkaline earth fluorides impurities therefrom, adding to the solution a chelating agent capable of retaining in solution other impurities present in the solution, adding ammonium hydroxide to the solution to precipitate beryllium hydroxide, and then filtering to obtain a substantially pure beryllium hydroxide filter cake.

3. In the process of purifying commercial grade beryllium hydroxide containing impurities comprising Si, Mg, Ca, Na, Fe, Al and alkaline earth fluorides, the steps of adding to a solution containing substantially beryllium sulfate and impurities other than silica and alkaline earth fluorides, a chelating agent selected from the group consisting of the tetra sodium salt of ethylenediamine tetra acetic acid, diethylene triamine penta acetic acid and trisodium hydroxyalkyl ethylenediamine triacetate, adding ammonium hydroxide to the solution to precipitate beryllium hydroxide, and then filtering to obtain a substantially pure beryllium hydroxide filter cake.

4. The method of purifying commercial grade beryllium hydroxide containing impurities comprising Si, Mg, Ca, Na, Fe, Al and alkaline earth fluorides which comprises preparing a slurry of commercial grade beryllium hydroxide and water in which the slurry contains about 20% by weight of beryllium oxide on a calculated basis, introducing such slurry into concentrated sulfuric acid in the proportion of approximately 90 gallons of slurry to 55 gallons of acid and simultaneously agitating such mixture, continuing the introduction of the slurry into the acid in a continuous and uninterrupted stream for a time of from between seven and nine minutes to obtain complete mixing of the proportions stated, continuing agitation of the mixture for about fifteen minutes, diluting the reaction liquor with de-ionized water in the proportion of approximately 200 gallons de-ionized water to the total amount of slurry-acid mixture, filtering the diluted reaction liquor to remove silica, alkaline earth fluorides, diluting the filtrate with de-ionized water by adding thereto about 1300 gallons of de-ionized water and a sufficient amount of ammonium hydroxide to adjust the pH to about 3.0, adding to the diluted filtrate about 2 gallons of a chelating agent selected from the group consisting of the tetra sodium salt of ethylenediamine tetra acetic acid, the penta sodium salt of diethylene triamine penta acetic acid, trisodium hydroxyalkyl ethylenediamine triacetate, increasing the pH to about 6.5 with ammonium hydroxide, boiling the mixture and adjusting the pH thereof to 6.5 with ammonium hydroxide, and then filtering the mixture to obtain a substantially pure beryllium hydroxide filter cake.

5. The process of purifying commercial grade beryllium hydroxide containing impurities comprising Si, Mg, Ca, Na, Fe, Al and alkaline earth fluorides which comprises reacting commercial grade beryllium hydroxide with about 50% excess concentrated sulfuric acid, baking the reaction mass at approximately 260° C. for about three hours, diluting the baked reaction mass to about 50 grams BeO per liter with de-ionized water, filtering the diluted baked reaction mass to remove silica, alkaline earth fluorides, diluting the filtrate to about 10 grams BeO liter with de-ionized water, adjusting the pH of the diluted filtrate to about pH 3.0 with ammonium hydroxide, adding a chelating agent selected from the group consisting of the tetra sodium salt of ethylenediamine tetra acetic acid, the penta sodium salt of diethylene triamine penta acetic acid, trisodium hydroxyalkyl ethylenediamine triacetate to effect retention of remaining impurities in solution, increasing the pH to about 6.5 with ammonium hydroxide, boiling the mixture with agitation and then readjusting the pH to about 6.5 with ammonium hydroxide, and then filtering to obtain a substantially pure beryllium hydroxide filter cake containing approximately 50% free water.

6. The method of purifying commercial grade beryllium hydroxide containing impurities comprising Si, Mg, Ca, Na, Fe, Al and alkaline earth fluorides which comprises preparing a slurry of commercial grade beryllium hydroxide and water in which the slurry contains about 20% by weight of beryllium oxide on a calculated basis, introducing such slurry into concentrated sulfuric acid in the proportion of approximately 90 gallons of slurry to 50 gallons of acid and simultaneously adding such mixture, continuing the introduction of the slurry into the acid in an uninterrupted stream for a time of about ten minutes to obtain complete mixing of the proportions stated, continuing agitation of the mixture for about fifteen minutes, filtering the reaction liquor to remove silica, diluting the filtrate with de-ionized water in the proportion of 1300 gallons of de-ionized water to the filtrate and simultaneously adding sufficient ammonium hydroxide to increase the pH to 3.0, adding 2 gallons of ethylenediamine tetra acetic acid to the mixture, increasing the pH of the solution to 6.5 with ammonium hydroxide, boiling for one hour with agitation, adjusting the pH of the solution to 6.5 with ammonium hydroxide, and filtering the solution to obtain a purified beryllium hydroxide filter cake.

7. The method of purifying plant grade beryllium hydroxide which comprises making an aqueous slurry of commercial grade beryllium hydroxide containing impurities comprising Si, Mg, Na, Fe, Al and alkaline earth fluorides, with the slurry containing approximately 20% by weight beryllium oxide in the slurry, introducing the slurry in a continuous fashion into an excess of concentrated sulfuric acid and over a period of time such as to reach a peak reaction temperature in excess of 300° F., filtering the reaction liquor to remove silica and alkaline earth fluorides impurities therefrom, adding to the solution a chelating agent selected from the group consisting of the tetra sodium salt of ethylenediamine tetra acetic acid, diethylene triamine penta acetic acid and trisodium hydroxyalkyl ethylenediamine triacetate, to effect retention of remaining impurities in solution, adding ammonium hydroxide to the solution to precipitate beryllium hydroxide, and then filtering to obtain a substantially pure beryllium hydroxide filter cake.

References Cited in the file of this patent

UNITED STATES PATENTS 2,899,276 Hutter _____ Aug. 11, 1959

OTHER REFERENCES

"Chemistry of the Metal Chelate Compounds," by Martell and Calvin, September 1953, pages IX, X, 510–513.